INVENTORS
ANTHONY J. HORNFECK
HAROLD H. KOPPEL
JOHN R. LOUIS
BY
*John F. Luhrs*
ATTORNEY INVENTORS
ANTHONY J. HORNFECK
HAROLD H. KOPPEL
JOHN R. LOUIS
BY John F. Luhrs
ATTORNEY INVENTORS
ANTHONY J. HORNFECK
HAROLD H. KOPPEL
JOHN R. LOUIS
BY John F. Luhrs
ATTORNEY United States Patent Office 3,015,768
Patented Jan. 2, 1962

3,015,768
POSITIONING MOTOR CONTROL SYSTEM
Anthony J. Hornfeck and Harold H. Koppel, South Euclid, and John R. Louis, Euclid, Ohio, assignors to Bailey Meter Company, a corporation of Delaware
Filed Jan. 14, 1959, Ser. No. 786,820
18 Claims. (Cl. 318—28)

This invention relates to electric control apparatus and more particularly to apparatus for receiving an electrical signal representative of a variable and for positioning a controller in accordance with the magnitude of the signal.

Most positioning systems in current use in electric control systems operate on either a force balance or a motion balance principle. In the typical force balance system, the electrical signal representative of the variable is transduced into a force which is utilized to effect deflection of a pivotal beam. The beam is effective upon deflection thereof to actuate a device such as an electric motor or pneumatic valve to effect positioning of the controller. A feedback or restoring force is generally applied to the beam in proportion to the controller position or output to balance the initial deflecting force. Thus, in response to an input electrical signal, the controller is positioned in proportion to the restoring force applied to the beam.

The motion balance system is analogous to the force balance system utilizing a balance of motions as contrasted with the balance of forces in the force balance system. With the motion balance system the electrical signal is employed to establish motion of an input beam which is balanced by movement of an output beam positioned in accordance with the controller output or position. Thus, in this case the controller position depends upon the rebalancing motion required.

To obtain sufficient power to position the controller from the output of the force balance and motion balance system, a pneumatic or electrical power amplifier is usually provided depending upon whether a pneumatic or electrical drive for the controller is employed.

While both the force balance and motion balance positioning systems have advantages, they are subject to certain limitations which may affect their reliability and accuracy. Perhaps the most serious limitation is the fact that variations in the gain of the power amplifier mentioned above will affect the accuracy and introduce an error in the controller position. Another limitation is the fact that temperature variations and frictional wear of the mechanical parts will also affect the accuracy of the system.

We have found that the limitations and disadvantages of the force balance and motion balance positioning systems can be overcome by employing a closed loop servo system which operates on a voltage balance principle. In one embodiment of our invention a voltage signal representative of a variable is compared with a voltage signal representative of the controller position, the difference voltage being employed as the input to the positioning system. With this arrangement, the positioning system is unaffected by variations in gain of the power amplifier, temperature variations of the components, and frictional wear of the mechanical parts.

Accordingly, it is the principal object of this invention to provide a positioning system substantially unaffected by variable operating conditions.

Another object of the invention is to provide a positioning system which operates on a closed loop voltage balance principle and eliminates the need for gain stabilized power amplifiers.

Other objects and advantages will become apparent from the following description taken in connection with the accompanying drawings wherein.

Figure 1:
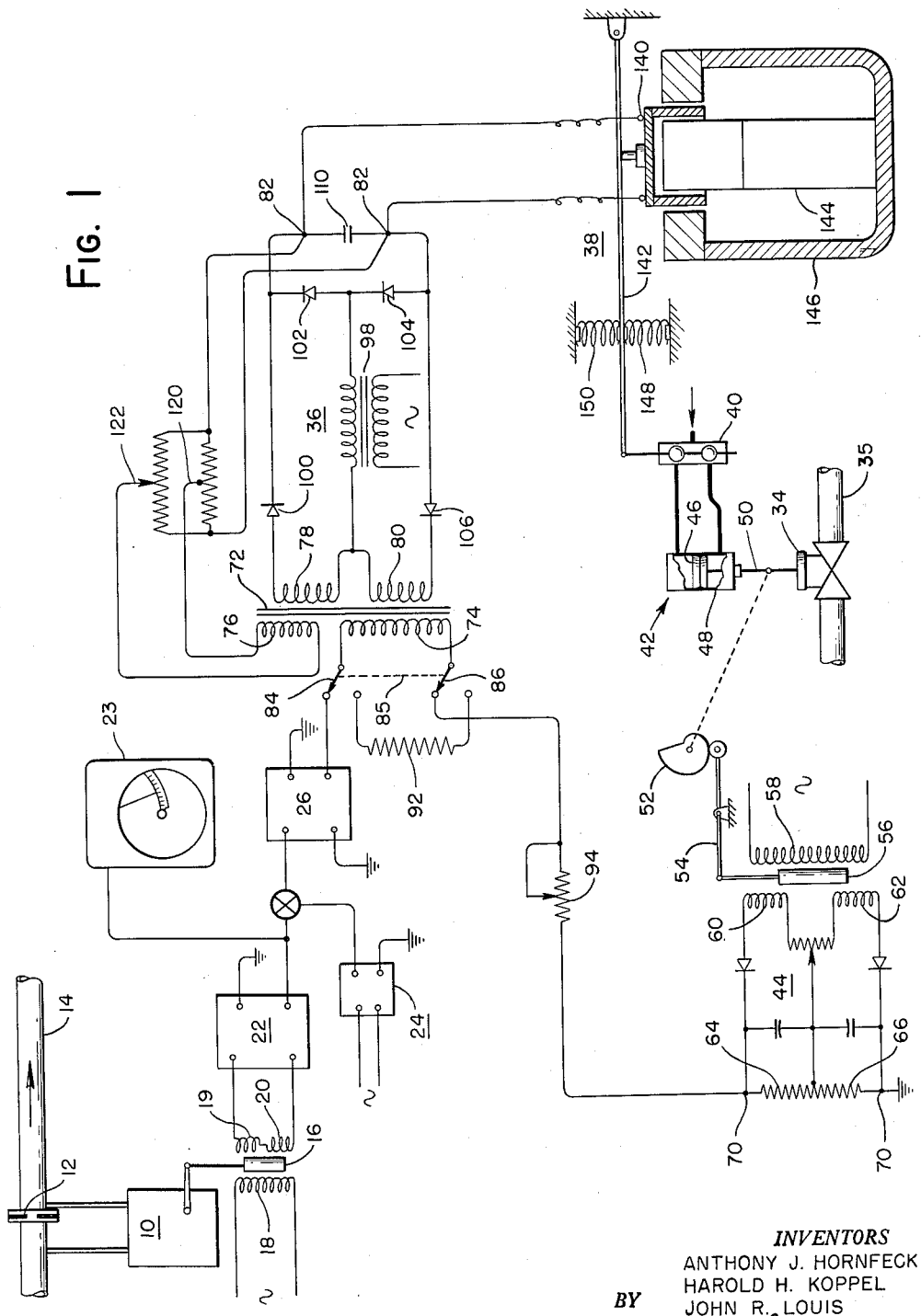
FIG. 1 is a schematic illustration of a positioning system embodying this invention.

Referring now to FIG. 1 of the drawings, there is shown a schematic illustration of a single element process control system employing a positioning system embodying this invention. A transmitting device 10 responsive to the differential pressure across a primary measuring element 12 representative of the flow rate in a conduit 14 is effective to actuate the movable core 16 of a movable core transformer having a primary winding 18 and a pair of serially connected oppositely wound secondary windings 19 and 20. The primary winding 18 is connected across a suitable source of alternating voltage as indicated schematically while the secondary windings 19 and 20 are coupled to a demodulator 22. With this arrangement a modulated signal is supplied to the input of the demodulator 22 with a carrier frequency corresponding to the frequency of the A.-C. source, the modulated amplitude of the signal being proportional to the flow rate through conduit 14. Transmitting devices of this nature are well known to those skilled in the art, and therefore, further description is deemed unnecessary.

The demodulator 22 is effective to remove the A.-C. carrier signal to establish a variable D.-C. signal at its output terminals proportional to the flow rate in conduit 14. The transmitting device 10 and demodulator 22 may be calibrated to produce any desired range and level of D.-C. voltage at the output terminals of demodulator 22 in the range of flow rates encountered. Preferably, however, these components are calibrated to produce a voltage in the range of −25 to +25 volts over the range of flow rates encountered.

The output of the demodulator 22 is recorded on a suitable recording instrument 23 and compared with a set point voltage established by a circuit 24, and the difference or error voltage is impressed on the input terminals of a controller 26. The controller 26 is effective to amplify the error signal and to induce desired control actions such as proportional, rate, or reset actions. Thus, an amplified D.-C. voltage in the range of −25 volts to +25 volts will appear at the output terminals of controller 26, the characteristics of the signal being dependent on the particular induced control action.

The positioning system is effective to transduce the −25 to +25 voltage output of the controller 26 into a pneumatic signal for positioning a valve 34 to control the flow rate in a conduit 35 which may be continuous with conduit 14 or form part of a separate flow system. In general, the positioning system comprises a magnetic amplifier 36 and a balanced positioning device 38 which is responsive to the output current of the amplifier 36 to actuate a pilot valve 40. The pilot valve 40 is effective to control operation of a pneumatic drive 42 and positioning of the valve 34. A feedback circuit 44 is effective to transduce the motion of the valve 34 into an electrical signal which is compared with the output signal of the controller 26 to establish an error or difference voltage which is utilized as the input to the magnetic amplifier 36. With this arrangement the amplifier 36, positioning device 38, valve 40, control drive 42, and feedback circuit 44 are connected in a closed loop circuit and are effective to continuously balance the valve position voltage against the output voltage of the controller 26 to maintain the input or error signal applied to the magnetic amplifier 26, zero.

Referring first to the structure of the control drive 42 and pilot valve 40, there is shown in FIG. 1 a double acting piston 46 which is movable in the cylinder 48 in accordance with the differential air pressure between the ends thereof. The pilot valve 40 is of the type disclosed in Johnson Patent 2,054,464 and provided with a pair of valve members carried by a common actuating stem for controlling the pneumatic pressures applied to opposite ends of the piston 46. In the neutral or center position of the stem wherein the valve members are equally spaced from their associated ports equal pressures are applied to opposite ends of the piston 46. However, movement of the stem in either direction from the center position thereof will establish a pressure difference between opposite ends of the piston 46 depending on the direction and extent of movement of the stem. The piston 46 is illustrated schematically as connected by linkage 50 to the valve 34 for transmitting movement thereto. Thus, actuation of the valve stem of pilot valve 40 is effective through means of control drive 42 to effect positioning of the valve 34 in a direction depending upon the direction of movement of the pilot valve stem.

The feedback circuit 44 is effective to establish a D.-C. voltage in the range of −25 to +25 volts representative of the position of the valve 34. To this end, a cam 52 is positioned by linkage 50 simultaneously with positioning of valve 34. The cam 52 follower positions a linkage 54 and the movable core 56 of a movable core transformer having a primary winding 58 connected to a suitable source of alternating voltage and a pair of secondary windings 60, 62 connected in a bridge circuit with a pair of resistors 64, 66. A pair of diode rectifiers and a pair of capacitors are connected in the bridge circuit to produce a direct voltage output across the bridge output terminals 70.

The movable core 56 is effective upon movement thereof by linkage 54 and cam 52 to vary the inductive coupling between the primary winding 58 and secondary windings 60, 62. When the movable core is at its center position with respect to the secondary windings 60, 62 the voltages induced in these two windings will be equal and the bridge output across terminals 70 will be zero. However, movement of the core 56 in either direction from the center position thereof will produce a greater induced voltage in one winding and a smaller induced voltage in the other winding depending on the direction of core movement to produce brdige unbalance and an outut voltage across terminals 70. By properly calibrating the range of movement of the core 56 with respect to the range of movement of the valve 34, the bridge output can be made to vary from −25 to +25 volts over the range of movement of the valve 34.

Referring now to the specific circuitry of the magnetic amplifier 36, this component comprises a magnetic core 72 having a primary control winding 74, a primary feedback winding 76, and a pair of output windings 78, 80. The amplifier 36 is generally of the self-saturating type, the D.-C. current in winding 74 being effective to control this self excitation to produce a variable output voltage across output terminals 82.

The opposite ends of the control winding 74 are connected to the movable switch arms 84, 86 of a double pole double throw switch 85 which are effective in the position shown to connect the outputs of the controller 26 and feedback circuit 44 to the winding 74, but are effective in the other positions of the switch arms to connect a resistor 92 across the winding 74 to facilitate adjustment of the null point of the system as will later be described. Thus, in the normal position of the switch arms as shown, an error voltage proportional to the difference between the outputs of controller 26 and feedback circuit 44 is applied to the winding 74 to establish the input signal to the magnetic amplifier 36. Since the magnetic flux established in core 72 is dependent on current flow rather than voltage, an adjustable resistor 94 is connected in series with the winding 74 to transform the error voltage into a current flow in the desired range.

Considering now the output circuit of the magnetic amplifier 36, the output windings 78, 80 are energized by the secondary winding of a transformer 98, the primary of which is coupled to a suitable A.-C. source. A movable coil later to be described is connected across the output terminals 82 to establish the load for the amplifier. Full wave rectification of the output current is achieved through the provision of diodes 100, 102, 104 and 106 which in addition facilitate self excitation of the amplifier.

The effect of the diodes 100, 102, 104, 106 and associated circuitry is to effect current flow through the winding 78 and load during one half cycle of the A.-C. source voltage and through the other winding 80 and the load during the other half cycle, the current flow through the load being in the same direction during both half cycles to effect full wave rectification and to cause each output winding when energized to produce a magnetic flux in the core 72 of equal magnitude and polarity. Thus, during each half cycle of the A.-C. voltage a circuit is completed through one of the windings 78, 80 and the load.

In the absence of any effect of magnetic flux in the core 72 it is apparent that the A.-C. source and rectifier circuitry is effective to establish a D.-C. current flow through the load. The magnitude of the load current and voltage, however, depends upon the impedances of each of the windings 78, 80 relative to the impedance of the load. When the load impedance is very small relative to the windings 78, 80 during each half cycle, only a small negligible voltage drop will occur across the load and the output signal may be considered zero. On the other hand when the load impedance is high relative to the impedances of windings 78, 80 the voltage drop across the load during both half cycles of the A.-C. source will be high, and an appreciable current will flow through the load.

The impedance of windings 78, 80 is dependent on the condition of saturation of the core 72. At saturation the impedances are minimum while the impedances are maximum when the core 72 has a low flux density. Thus, when complete saturation of the core 72 exists maximum output voltage exists across the load while at minimum flux density the output voltage is negligible and substantially zero as previously described.

Figure 2:
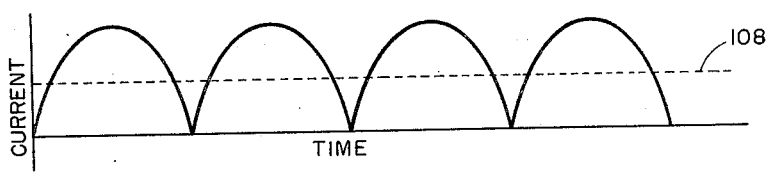
FIGS. 2–6 are graphical illustrations of the operation and characteristics of the embodiment illustrated in FIG. 1.

Magnetic flux in the core 72 is produced by two conditions, namely, the current flow in winding 74 and the current flow through windings 78, 80 as a result of energization thereof by the A.-C. source. Considering first the effect of current flow in windings 78, 80 reference is made to FIG. 2 which illustrates the normal wave form of a full wave rectified alternating current. Assuming that complete saturation of the core 72 will occur when the current has a magnitude of approximately one half the peak value thereof as shown by the line 108, then during each half cycle saturation of the core 72 will occur when the current has built up to one half of its peak value. When the current is below the saturation level the impedance of windings 78, 80 will be maximum and the voltage drop across the load will be substantially zero. As the core becomes saturated, however, the impedance decreases toward its minimum value and a high voltage drop is produced across the load. This effect will be apparent from the output voltage curve illustrated in FIG. 3. As shown the output voltage is substantially zero at the beginning of each half cycle but as saturation occurs there is a rapid buildup whereupon the voltage drop follows the sine curve for the remainder of each half cycle.

A regenerative or internal positive feedback effect occurs as the core 72 becomes saturated which produces the rapid transition from a non-saturated state to a saturated state. As the impedance of each of the windings 78, 80 starts to decrease the voltage drop across the load will start to increase to in turn increase the current flow in the output circuit resulting in a further increase in the magnetomotive force (M.M.F.) to establish a regenerative action causing a rapid transition from substantially zero load voltage to maximum load voltage during each half cycle. In addition, due to this regenerative action the core 72 will remain saturated over the remainder of each half cycle as illustrated by the curve in FIG. 3.

Figure 4:
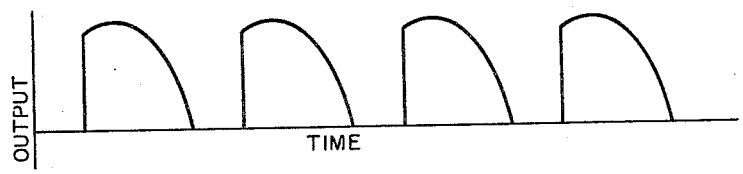

Considering now the effect of the input signal or error signal applied to winding 74, the D.C. current flow in winding 74 is effective to control the point at which saturation of the core 72 will occur during each half cycle. The winding 74 produces a M.M.F. which aids or subtracts from the M.M.F. produced by windings 78, 80 depending on the magnitude and direction of current flow in winding 74. Thus, if the controller 26 output voltage is more negative than the output of circuit 44, the M.M.F. produced will oppose that produced by windings 78, 80 and increase the current flow in the windings 78, 80 required to saturate the core 72. As a result the maximum output voltage will be developed at a later point during each half cycle as illustrated by the curve in FIG. 4.

Figure 5:
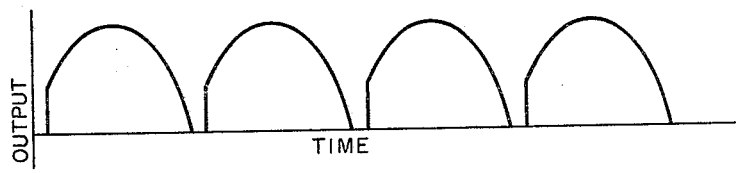

The opposite effect will occur when the error signal applied to winding 74 is positive. In this case the M.M.F. will aid the M.M.F. produced by the windings 78, 80 and complete saturation will occur at an earlier point during each half cycle as shown by the curve in FIG. 5.

It will be apparent from the above that the D.-C. error signal is effective to control the point at which saturation of the core 72 will occur during each half cycle of the A.-C. source voltage to produce a triggering action which will vary the average output voltage across the load. A capacitor 110 connected across the output terminals 82 is effective to smooth the output voltage wave to produce a substantially uniform direct output voltage the magnitude of which depends on the signal applied to winding 74.

External feedback is employed in the magnetic amplifier 36 to determine the null point of the system. More particularly, the feedback winding 76 is connected to the output terminals 82 through an adjustable bridge circuit 120 having a movable contact arm 122 to regulate the bridge output and the magnitude and direction of current flow in winding 76 to thereby provide for both positive and negative feedback. With this arrangement, a M.M.F. is established in the core 72 which adds to or subtracts from the initial M.M.F. established by windings 78, 80 to control the saturation point in the basic curve illustrated in FIG. 2 and thus determine the initial output voltage level when the error signal applied to winding 74 is zero. By adjustment of contact arm 122 this output voltage level can be varied to vary the null of the entire positioning system as will hereinafter be described.

Figure 6:
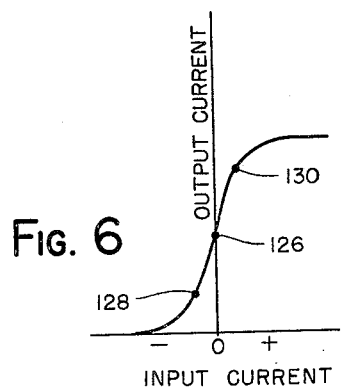
Figure 9:
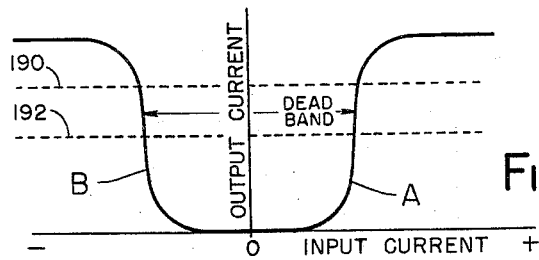

FIG. 6 illustrates the basic characteristic curve (input current versus output current) for the magnetic amplifier 36. Point 126 indicates the output current produced when the error voltage and input current to winding 74 is zero. Point 128 indicates the output current when the error voltage has a maximum negative value while point 130 indicates the output current when the error voltage has a maximum positive value.

Referring now to the positioning device 38, the output terminals 82 of the amplifier 36 are connected to a coil 140 which is wound on a suitable circular frame carried on the medial portion of a pivoted beam 142. The other end of the beam is operatively connected to the stem of pilot valve 40 for positioning the same.

The coil 140 is movable over the center pole 144 of a permanent magnet 146. The output current of the magnetic amplifier in coil 140 establishes a magnetic field which is opposed by the magnetic field of the magnet 146, the vertical position of the coil being determined by the relative magnitudes of the magnetic forces. An increase in the output current of amplifier 36 will result in upward movement of the coil 140 while a decrease will result in downward movement of the coil.

Preferably, the output current of the magnetic amplifier 36 is adjusted by contact arm 122 whereby, when the error signal applied to the winding 74 is zero, the position of the beam 142 will be such that the stem of pilot valve 40 will be in its center position previously described wherein equal pressures are applied to opposite sides of the piston 46.

To assist in maintaining this balanced condition of the beam 142 at zero error signal a pair of balancing springs 148, 150 act against opposite sides of the free end of the beam 142. The lower spring 148 is provided with an upward force slightly greater than required to support the weight of the beam while the upper spring 150 establishes a suppressive force which prevents overshoot upon positioning of the beam 142.

To adjust the null of the system, the switch 85 is thrown to connect resistor 92 across the input winding 74 to establish a zero input signal. After this operation, the contact arm 122 may be adjusted until the beam 142 is balanced at the center position of the pilot valve stem. If the pilot valve stem is not at this center position, positioning of the valve 34 will occur due to the inequality of the pressures on opposite sides of the piston 46. Thus, to set the null of the system it is only necessary to adjust the contact arm 122 until the piston 46 and associated linkage remain stationary.

Figure 3:
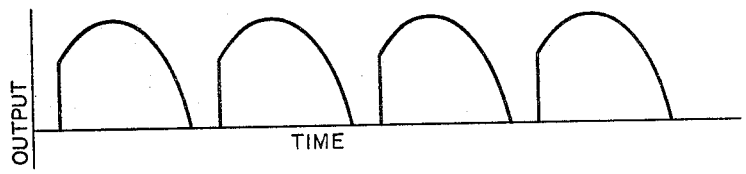

Referring now to the operation of the entire system illustrated in FIG. 1, assume that the error signal applied to winding 74 is zero and that the beam 142 is in a balanced condition wherein the pressure differential across the piston 46 is zero. With this condition the output voltage of the magnetic amplifier 36 will be that produced through self-saturation as illustrated by the curve of FIG. 3, and accordingly, an output current will flow in coil 140 sufficient to maintain balance of the beam 142.

Assuming now an increase in the flow rate in conduit 14, the output signal in controller 26 will increase to establish a positive error voltage across winding 74 and resistor 94. As shown by the curve in FIG. 5 this error voltage and the resulting current flow in winding 74 will increase the M.M.F. in core 72 to advance the point during each half cycle that complete saturation occurs as a result of current flow in windings 78, 80. As a result, the output current in coil 140 will increase and pivotal clockwise movement of the beam 142 will occur to actuate the stem of pilot valve 40. Actuation of the pilot valve 40 will be effective to establish a pressure differential across the piston 46 to effect movement thereof in one direction.

As the piston 46 is actuated, the cam 52 and movable core 56 will be positioned simultaneously to increase the output potential of the feedback circuit 44 at terminals 70. As this feedback or valve position voltage increases the error signal will decrease to decrease the output current of the magnetic amplifier 36. This action will continue until the valve position voltage equals the output voltage of controller 26 whereupon the error voltage will be zero and the beam 38 will have returned to its balanced position precluding any further positioning of the valve 34. Thus, in response to a change in the output of controller 26, the system will position the valve 34 until the valve position voltage equals the controller voltage output, whereupon the system will come to rest at a new valve position. It will be apparent that a decrease in the output voltage of the controller will produce a similar result with response of the various elements in the opposite direction.

The advantages of the positioning system will now be apparent. One important advantage of the system is the fact that positioning of the valve 34 will occur until the error signal is reduced to zero. Thus, the system always seeks to eliminate the error signal providing highly accurate response to a change in a measured variable.

It is to be noted that all components of the positioning system are contained within a closed loop circuit. With this arrangement, the system is insensitive to many variables such as amplifier grain, temperature effects, and changing characteristics of the components. Thus, the stability and accuracy of the system is extremely high and substantially unaffected by extraneous conditions.

Another important feature of the system is the fact that the null point can be readily adjusted by adjustment of contact arm 122 to vary the external feedback of the amplifier 36. This feature eliminates the need for the separate D.-C. bias windings usually provided in magnetic amplifiers and therefore reduces the overall cost of the amplifier. While this adjustment may result in some variation in the sensitivity of the amplifier, the change may be compensated for by adjustment of resistor 94.

Figure 7:
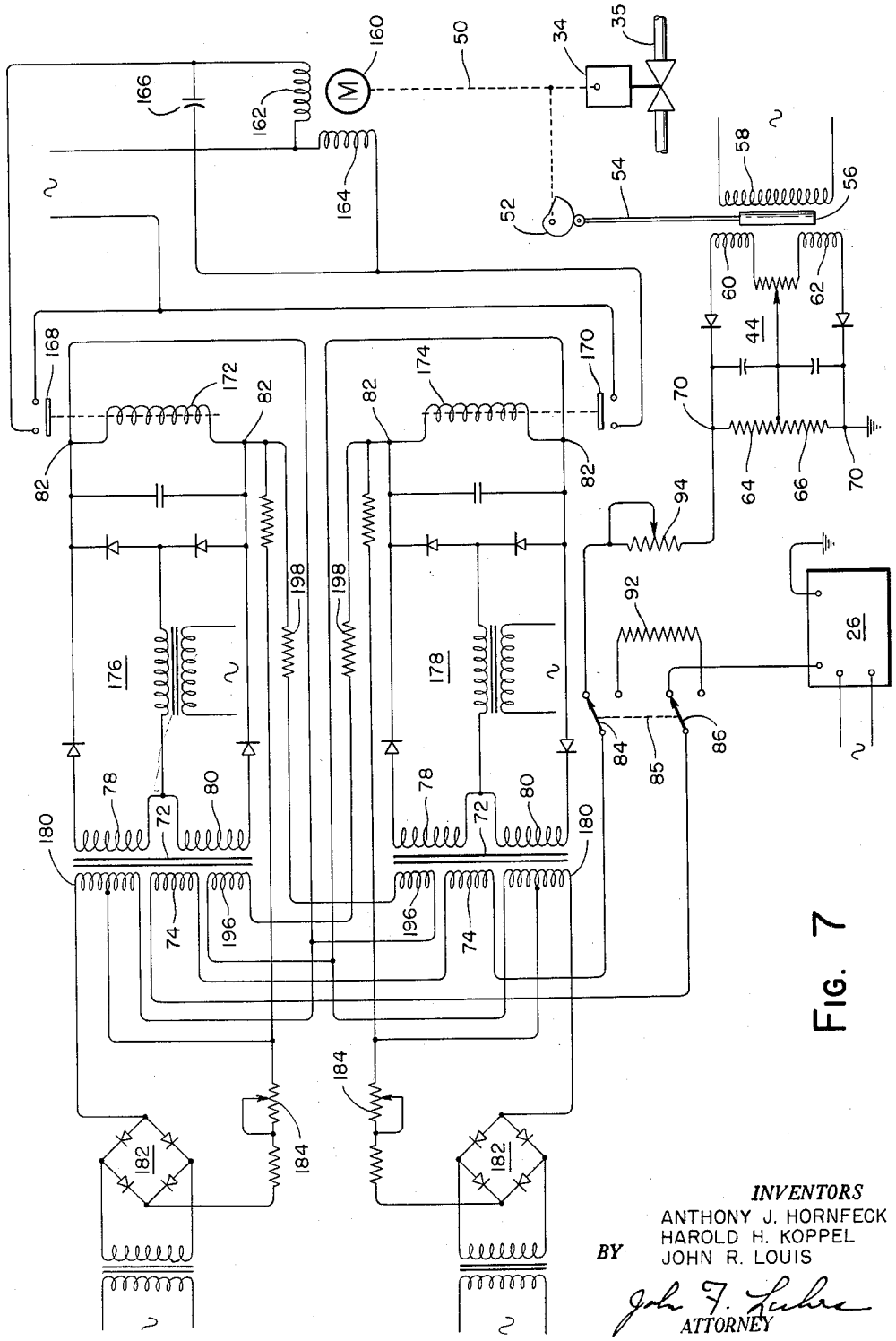
FIG. 7 is a view similar to FIG. 1 but illustrating another embodiment of the positioning system.

Another embodiment of the positioning system is illustrated in FIG. 7. This embodiment also operates on a voltage balanced principle but is particularly adapted for controlling the operation of an electric drive. For purposes of simplicity, parts similar to those illustrated in FIG. 1 have been given like reference numerals.

In the embodiment of FIG. 7, the linkage 50 is illustrated schematically as actuated by a reversible motor 160 in place of the piston 46 illustrated in FIG. 1. The electric motor 160 is provided with a pair of control windings 162, 164 connected in a motor control circuit with a capacitor 166 and a pair of switches 168, 170 adapted to be actuated from their normally open positions as illustrated to closed positions by relay coils 172, 174 respectively. As indicated power is supplied to the motor control circuit from a suitable A.-C. source.

The purpose of the capacitor 166 is to establish a 90° phase relationship between the voltages applied to the windings 162, 164. When the switch 168 is closed and switch 170 open, a circuit is completed from the power source directly through the winding 162 and through the capacitor 166 in series with the other winding 164 to establish the 90° phase relationship causing the motor 160 to rotate in one direction. On the other hand, if the switch 170 is closed and switch 168 open, then the winding 164 will be connected directly across the power source while the winding 162 will be connected in series with capacitor 166 to thus reverse the phase relationship to effect rotation of the motor 160 in the opposite direction. The motor 160 is effective upon rotation thereof in one direction to actuate linkage 50 in a manner to open the valve 34 but effective upon rotation thereof in the opposite direction to close the valve 34.

In this embodiment, two magnetic amplifiers 176, 178 are provided which are generally similar in circuitry to the magnetic amplifier 36 illustrated in FIG. 1, but differ in the provision for separate D.-C. bias and interlocking windings. The circuitry of each amplifier which is similar to that illustrated in FIG. 1 has been given like reference numerals.

In this case the loads for the amplifiers 176, 178 comprise relay coils 172, 174 respectively, each relay coil being connected across the output terminals 82 of its associated amplifier. The input windings 74 of the amplifiers 176, 178 are connected in a series circuit between the movable switch arms of the switch 85. Thus, in the normal position of the switch 85 both windings will be connected in series with resistor 94 between the output of controller 26 and the output of feedback circuit 44 to subject both input windings to the error signal, while in the other position of the switch 85 the resistor 92 will be connected across both windings to facilitate adjustment of the null point.

In the embodiment of FIG. 7, the magnetic amplifiers 176, 178 are each provided with a second input winding 180, a portion of which is connected across the output terminals 82 and the other portion of which is connected to the output of a D.-C. bias power supply 182 energized by suitable A.-C. sources. A D.-C. bias voltage is thus applied to one portion of each winding 180 while the other portion serves as part of an external feedback circuit. An adjustable resistor 184 is connected in series with each power supply 182 to permit adjustment of the D.-C. bias. The purpose of providing separate D.-C. bias windings is to facilitate adjustment of the dead band of the system as will later be described.

In this embodiment the input control windings 74 are wound in opposite directions on their associated cores to cause one amplifier 176 to produce an increasing positive output signal in response to an increase of the error signal in a positive direction similar to the amplifier of FIG. 1, but to cause the other amplifier 178 to produce an increasing positive output signal in response to an increase in the error signal in a negative direction. Thus, by reversing the effect of the M.M.F. produced by the windings 74, one magnetic amplifier 176 is responsive only to a positive error signal while the other amplifier 178 is responsive only to a negative error signal.

With the above described arrangement of the input windings 74, the two magnetic amplifiers are operative as a switching means, the amplifier 176 being effective to produce an output potential in response to a positive error signal of predetermined magnitude to effect closure of switch 168 and rotation of motor 160 in one direction, and the amplifier 178 being effective in response to a negative error signal of predetermined magnitude to effect closure of switch 170 and rotation of motor 160 in the opposite direction. This effect will become apparent from FIG. 8 which illustrates the characteristic curves for the two amplifiers 176, 178. Curve A is the characteristic curve for amplifier 176, while curve B represents the characteristic curve for amplifier 178.

The output voltage level required to effect closure of switches 168, 170 by their associated relay coils is indicated by line 190 while the drop out voltage level is indicated by line 192. The dead band for the system is illustrated schematically as the spacing between the two curves and may be expressed generally as the voltage difference between the magnitude of the error signal at which dropout of switch 168 occurs and the voltage level at which pick-up of switch 170 occurs.

The operation of each of the amplifiers 176, 178 is substantially the same as the operation of magnetic amplifier 36 of FIG. 1, the input error voltage being effective to produce a triggering action to control the self-excitation of the output circuit. Each amplifier is provided with internal positive feedback and external feedback to control the slope of the characteristic curve.

The purpose of providing an adjustable D.-C. bias winding in each of the amplifiers 176, 178 is to enable adjustment of the deadband of the system. The bias windings are effective to establish initial saturation of the core 74 to vary the level of the input error signal at which complete saturation will occur. Since each amplifier is provided with its own independent bias, the characteristic curves may be shifted independently to produce desired dead bands and actuation of the switches 168, 170 at desired magnitudes of the error signal.

Figure 8:
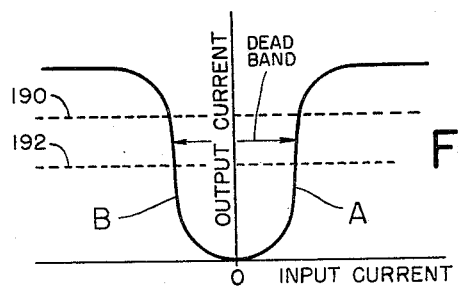
FIGS. 8 and 9 are graphical illustrations of the operation and characteristics of the embodiment illustrated in FIG. 7.

FIGURE 8 illustrates the characteristic curves A and B for the amplifiers 176, 178 respectively when the D.-C. bias in each amplifier is zero. To illustrate the effect of varying the bias, reference is made to FIG. 8 which illustrates the characteristic curves A and B when the amplifier 176 is provided with a positive D.-C. bias and the amplifier 178 is provided with a negative D.-C. bias to shift both characteristic curves with respect to the zero ordinate.

Due to the fact that windings 74 of the amplifiers 176, 178 are wound in opposite directions so as to cause one amplifier to respond to a negative error signal and the other amplifier to respond to a positive error signal, it is unlikely that closure of switches 168, 170 will occur at the same time. As a safeguard against such a condition arising, however, an interlocking circuit is provided. More particularly, each of the amplifiers 176, 178 is provided with an additional input winding 196 which is connected through a resistor 198 to the output of the other amplifier. Each winding is wound on its associated core 72 in a direction opposite from that of the input winding 74 of its amplifier. With this arrangement the output of each amplifier is utilized as the input to the other amplifier to establish a degenerative magnetic flux in the core of one amplifier when an output voltage is produced by the other. Thus, when a positive error signal of magnitude sufficient to effect closure of switch 168 is applied to the input windings 74 of the two amplifiers 176, 178, a degenerative voltage will be applied to the winding 196 of amplifier 178 to prevent its output from reaching a value sufficient to effect closure of switch 250 regardless of the value of the bias voltage or error voltage applied to that amplifier. The opposite effect will occur when the error signal is negative to close switch 170. In this case the output of amplifier 176 will be limited by the degenerative flux established by its winding 196. Thus, an electrical interlock is provided which safeguards against abnormal operation.

The operation of the positioning system illustrated in FIG. 7 is generally similar to that of the system illustrated in FIG. 1 in that a closed loop voltage balance effect is utilized. If the error signal (difference between the controller 26 output and feedback circuit 44 output) is zero and the D.-C. bias in each amplifier is adjusted to produce the characteristic curves illustrated in FIG. 8, both relay coils 172, 174 will be deenergized since the output of both amplifiers will be zero. If the error signal should now increase in a positive direction due to a change in the flow rate in conduit 14, no positioning of the valve 34 will occur until the output of magnetic amplifier 176 increases to voltage level 190 indicated in FIG. 8 whereupon relay coil 172 will close switch 168 to effect rotation of the motor 160 and positioning of valve 34 in one direction.

As the valve is positioned, the movable core 56 will be simultaneously positioned to increase the output of feedback circuit 44 as described in connection with FIG. 1. As a result the error signal will decrease causing a corresponding decrease in the output of amplifier 176. When the output decreases to the level indicated by line 192 of FIG. 8, the relay coil 172 will open switch 168 to de-energize the motor 160 whereupon the system will come to rest at the new valve position.

When the error signal increases in a negative direction to establish a positive output from amplifier 178 of the voltage level 190, switch 170 will close to effect rotation of the motor 160 and positioning of valve 34 in an opposite direction until the error signal is reduced to the level 192.

Due to the dead band of the system as indicated in FIG. 8 the error signal is not reduced to zero when the system comes to rest but will vary through a small positive and negative range without positioning of the valve 34. Such a dead band is desirable to prevent incessant operation of the motor 160 due to overshoot of the valve position. It will be apparent that by adjusting the D.-C. bias voltage in each amplifier through positioning of contact arms 184 the dead band may be adjusted to any desired valve or even eliminated from the system.

Due to the arrangement of the input windings 74 the magnetic amplifier 176 is responsive only to a positive error signal and the amplifier 178 is responsive normally only to the negative error signal. The interlocking means comprising windings 196 insures this selective response by producing a degenerative effect in one amplifier during response of the other. Thus, the system is a highly efficient voltage balance positioning system capable of accurately controlling the position of a valve or other control element from a variable signal.

While two embodiments of the invention have been herein shown and described, it will be apparent to those skilled in the art that many changes may be made in the construction and arrangement of parts without departing from the scope of the invention as defined in the appended claims.

What we claim as new and desire to secure by Letters Patent of the United States is:

1. An electric control system, comprising, a pneumatic controller for varying the magnitude of a variable, means including a pilot valve effective to control the operation of said controller, an electrical circuit including a transformer having a movable core adapted to be actuated simultaneously with said controller to establish a voltage signal representative of the position of said controller, means for establishing a voltage signal representative of the magnitude of the variable, a magnetic amplifier having an input winding and a pair of output terminals, circuit means for applying said voltage signals to said input winding in opposition, and magnetic means responsive to the output signal of said amplifier for actuating said pilot valve to effect positioning of said controller and control of the variable.

2. A positioning system responsive to an electrical signal representative of a variable for positioning a controller, comprising, means for establishing an electrical signal representative of the magnitude of the variable, means for establishing an electrical signal representative of the position of the controller, a pair of magnetic amplifiers having oppositely arranged input windings to cause one amplifier to produce an output signal in response to a negative input signal and the other amplifier to produce an output signal in response to a positive input signal, circuit means for applying the difference between said established signals to each of said input windings, a reversible electric motor operative in opposite directions to effect positioning of the controller in opposite directions, a first relay actuated switch means responsive to the output of said one amplifier to effect operation of said motor in one direction, and a second relay actuated switch means responsive to the output of the said other amplifier to effect rotation of said motor in the opposite direction.

3. In a positioning system, a combination comprising, a reversible electric motor, a control circuit for said motor including a first switch effective to control operation of said motor in one direction and a second switch for controlling operation of said motor in the opposite direction, a pair of relay coils for actuating said switches respectively, a pair of magnetic amplifiers having a pair of input windings respectively and output terminals respectively connected to said relay coils, said input windings being wound in opposite directions to cause one of said amplifiers to produce an output signal in response to a negative input signal and the other said amplifier to produce an output signal in response to a positive input signal, circuit means connecting said input windings in a series circuit, means responsive to a variable for applying an electrical signal to said circuit variable through a positive and negative range over the range of variation of the variable, and a degenerative input winding associated with each of said amplifiers responsive to the output of the other amplifier for preventing energization of both of said relay coils at one time.

4. In an electric control system, the combination comprising, a pneumatic controller for varying the magnitude of a variable, means including a pilot valve for controlling operation of said controller, means for establishing a voltage signal representative of the magnitude of the variable, means for establishing a voltage signal representative of the position of the controller, a magnetic amplifier having an input winding and a pair of output terminals, circuit means for applying said voltage signals to said input winding in opposition, a pivotal beam effective upon displacement thereof to actuate said pilot valve, and magnetic means responsive to the output signal of said amplifier for displacing said beam.

5. In an electric control system as claimed in claim 4 wherein said magnetic means comprises a permanent magnet fixed relative to said beam, and a coil connected to the output terminals of said amplifier and mounted on said beam adjacent said permanent magnet to establish a magnetic field proportional to the output of said amplifier acting in opposition to the magnetic field of said permanent magnet.

6. In a control system, the combination comprising, a pneumatic controller for varying the magnitude of a variable, a pneumatic pilot valve adapted to be actuated to effect positioning of said controller, a pivotal beam having one end operatively connected to said pilot valve, magnetic means having a fixed portion and a portion movable with said beam establishing opposing magnetic fields, one of said portions being responsive to a variable electrical signal to effect displacement of said beam, and a pair of biasing springs acting on opposite sides of said beam respectively to stabilize the same.

7. In an electric control system, the combination comprising, a pneumatic controller for varying the magnitude of a variable, a pilot valve adapted to be actuated to vary the position of said controller, means for establishing a voltage signal representative of the magnitude of the variable, an electric amplifier for amplifying said signal, a pivotal beam having one end connected to said pilot valve for actuating the same upon displacement of said beam, magnetic means operatively associated with said beam responsive to the output of said amplifier for effecting displacement of said beam, and a pair of biasing springs acting on opposite sides of said beam respectively to stabilize the same.

8. A positioning system responsive to an electrical signal representative of a variable, comprising, a controller operative in opposite directions to vary the magnitude of the variable, means for establishing an electrical signal variable in a predetermined positive and negative range representative of the magnitude of the variable, a pair of electric amplifiers each connected to said variable responsive means and having oppositely arranged inputs to cause one amplifier to produce an output signal in response to a negative signal and the other amplifier to produce an output signal in response to a positive signal, first actuating means responsive to the output of said one amplifier to effect operation of said controller in one direction, and second actuating means responsive to the output of said other amplifier to effect operation of said controller in the opposite direction.

9. A positioning system responsive to an electrical signal representative of a variable, comprising a controller operative in opposite directions to control the magnitude of the variable, means for establishing a first electrical signal representative of the magnitude of the variable, means for establishing a second electrical signal representative of the position of the controller, a pair of electric amplifiers having oppositely arranged circuits to cause one amplifier to produce an output signal in response to a negative signal and the other amplifier to produce an output signal in response to a positive signal, circuit means for applying the difference between said signals representative of the variable and controller position to each of said amplifiers, said difference signal being variable in a predetermined positive and negative range, first actuating means responsive to the output of said one amplifier to effect operation of said controller in one direction, and second actuating means responsive to the output of said other amplifier to effect operation of said controller in the opposite direction.

10. A positioning system as claimed in claim 9 wherein said amplifiers comprise magnetic amplifiers having oppositely arranged input windings to which said difference signal is applied.

11. In a control circuit, the combination comprising, a pair of magnetic amplifiers having differently arranged input windings to cause one amplifier to produce an output signal in response to an input signal in a first predetermined range and the other amplifier to produce an output signal in response to an input signal in a second predetermined range, and a degenerative input winding associated with each of said amplifiers responsive to the output of the other amplifier for preventing the occurrence of an output from both of said amplifiers at the same time.

12. In a control circuit, the combination comprising, a pair of magnetic amplifiers having oppositely arranged input windings to cause one amplifier to produce an output signal in response to a positive input signal and the other amplifier to produce an output signal in response to a negative input signal, and a degenerative input winding associated with each of said amplifiers responsive to the output of the other amplifier for preventing the occurrence of an output from both of said amplifiers at the same time.

13. In a control circuit, the combination comprising, a pair of electric amplifiers having oppositely arranged inputs to cause one amplifier to produce an output signal in response to an input signal in a positive range and the other amplifier to produce an output signal in response to an input signal in a negative range, and a degenerative input circuit associated with each of said amplifiers responsive to the output of the other amplifier for preventing the occurrence of an output from both of said amplifiers at the same time.

14. A positioning system responsive to an electrical signal representative of a variable, comprising, a controller operative in opposite directions to control the magnitude of the variable, means for establishing an electrical signal representative of the magnitude of the variable, a first amplifier responsive only to variations of said signal in a first predetermined range for producing a first output signal, a second amplifier responsive only to variations of said signal in a second predetermined range to produce a second output signal, actuating means responsive to said first output signal to effect operation of said controller in one direction and responsive to said second output signal to effect operation of said controller in the opposite direction, said first and second amplifiers having a predetermined dead band between the adjacent limits of said first and second ranges wherein neither amplifier is operative and wherein said controller is not positioned.

15. A positioning system as claimed in claim 14 wherein said first and second amplifiers comprise magnetic amplifiers having oppositely wound input windings to effect response of said first amplifier to a positive signal in a predetermined positive range and response of said second amplifier to a negative signal in a predetermined negative range.

16. A positioning system as claimed in claim 15 wherein each of said magnetic amplifiers is provided with a bias winding connected to a source of direct voltage for determining said ranges.

17. A positioning system as claimed in claim 16 wherein an adjustable resistance is connected in series with each of said bias windings to provide for adjustment of said ranges and said dead band.

18. A positioning system responsive to an electrical signal representative of a variable for positioning a controller, comprising, circuit means for establishing an electrical signal representative of the controller position, a magnetic amplifier comprising a magnetic core having input and output windings and a feedback winding, an output circuit connected to said output winding, a feedback circuit connecting the output circuit to said feedback winding, means for applying said controller position signal and the signal representative of the variable to said input winding to produce a signal in said output circuit proportional to the difference between said signals, means responsive to said output signal for positioning the controller, means for biasing the last said means in one direction, and an adjustable resistance connected in said feedback circuit for determining the output of said amplifier when said signals are equal to thereby determine the null position of said positioning means.

References Cited in the file of this patent

UNITED STATES PATENTS

| | | |
|---|---|---|
| 2,398,421 | Frische et al. | Apr. 16, 1946 |
| 2,450,084 | Emerson | Sept. 28, 1948 |
| 2,486,151 | Gross et al. | Oct. 25, 1949 |
| 2,523,198 | Davies | Sept. 19, 1950 |
| 2,678,177 | Cherney et al. | May 11, 1954 |
| 2,729,772 | Perkins | Jan. 3, 1956 |
| 2,878,435 | Rich et al. | Mar. 17, 1959 |

OTHER REFERENCES

Platt, Sindey: Magnetic Amplifiers, Theory and Application, first edition, pp. 136 and 160; Prentice-Hall, Englewood, N.J., 1958.